(12) United States Patent
Tu et al.

(10) Patent No.: US 12,191,900 B2
(45) Date of Patent: Jan. 7, 2025

(54) MILLIMETER WAVE RADIO FREQUENCY STRUCTURE

(71) Applicant: QuantumZ Inc., Kaohsiung (TW)

(72) Inventors: Kun-Yen Tu, Kaohsiung (TW);
Meng-Hua Tsai, Kaohsiung (TW);
Wei-Ting Lee, Kaohsiung (TW);
Sin-Siang Wang, Kaohsiung (TW);
Gang-Lin Zhang, Kaohsiung (TW)

(73) Assignee: QUANTUMZ INC., Kaohsiung (TW)

( * ) Notice: Subject to any disclaimer, the term of this patent is extended or adjusted under 35 U.S.C. 154(b) by 352 days.

(21) Appl. No.: 17/872,001

(22) Filed: Jul. 25, 2022

(65) Prior Publication Data
US 2023/0030634 A1 Feb. 2, 2023

(30) Foreign Application Priority Data

Jul. 27, 2021 (TW) .................. 110127566

(51) Int. Cl.
*H04B 1/38* (2015.01)
*H01Q 1/38* (2006.01)
*H01Q 21/24* (2006.01)
*H04B 7/10* (2017.01)

(52) U.S. Cl.
CPC ............... *H04B 1/38* (2013.01); *H01Q 1/38* (2013.01); *H01Q 21/24* (2013.01); *H04B 7/10* (2013.01)

(58) Field of Classification Search
None
See application file for complete search history.

(56) References Cited

U.S. PATENT DOCUMENTS

2021/0135378 A1* 5/2021 Cho .................. H01Q 1/2283

* cited by examiner

*Primary Examiner* — Suhail Khan
(74) *Attorney, Agent, or Firm* — Leong C. Lei

(57) ABSTRACT

A millimeter wave radio frequency (RF) structure uses a substrate including a liquid-crystal polymer material, at least one dual-polarized antenna, a RF transceiver module, and a switching module electrically connected to the at least one dual-polarized antenna and the RF transceiver module, where the switching module includes a first switching element and a second switching element electrically connected to the at least one dual-polarized antenna, and a third switching element electrically connected to the first switching element and the second switching element, to enhance characteristics of a liquid-crystal polymer (LCP) substrate for millimeter waves, and implement high-frequency, high-speed transmission while ensuring high reliability.

12 Claims, 5 Drawing Sheets

MILLIMETER WAVE RADIO FREQUENCY STRUCTURE

BACKGROUND

Technical Field

The present invention relates to the field of communication technologies, in particular, to a millimeter wave radio frequency (RF) structure.

Related Art

Wireless communication technologies are rapidly developing in recent years. As transmission speed and volume significantly increase, higher frequencies are used for transmission. Frequencies utilized by devices or technologies demanding higher speeds and larger volumes often fall within a GHz frequency band, that is, the millimeter wave region. Therefore, the millimeter wave is a key communication technology for the next generation, currently referred to as the 5G system. Amongst all components, a liquid-crystal polymer (LCP) plate sustaining processing elements and transmitting signals plays a very important role.

Printed circuit boards (PCB) are commonly used in circuit design. A rigid PCB may be significantly limited in its use due to excessive loss of a high-frequency signals in the millimeter waves. When a mobile communication device (such as a satellite communication or cellular device) needs to transmit a large amount of data at a high speed, signals need to be transmitted in a flexible liquid-crystal polymer plate in a high-speed and high-frequency operating condition, thus maintaining signal integrity becomes a very important issue. In addition, when the transmission speed is higher and the data volume is larger, signal distortion become increasingly serious. Therefore, circuit boards applied in the millimeter waves require a low dielectric constant (Dk) and a low dissipation factor (Df) to ensure complete transmission of information. Compared to a rigid circuit board, a liquid-crystal polymer plate has advantages such as light weight, small size, excellent extensibility, and high-density wiring.

SUMMARY

The present invention provides a millimeter wave RF structure to resolve problems of a high-frequency millimeter wave RF module and enhance a high-frequency RF module. A liquid-crystal polymer plate, a micro-electro-mechanical system switch (MEMS switch), an RF gallium arsenide (GaAs) processed chip are utilized to alleviate problems encountered in the millimeter wave RF module.

A substrate comprises a liquid-crystal polymer material. At least one dual-polarized antenna element is arranged on the substrate and configured to transmit and receive frequency signals. An RF transceiver module is configured to transmit and receive a frequency signal with an electric field strength direction unpolarized. A switching module is electrically connected to the dual-polarized antenna elements and the RF transceiver module. The switching module comprises a first switching element and a second switching element electrically connected to the dual-polarized antenna, and a third switching element electrically connected to the first switching element and the second switching element. The first switching element and the second switching element respectively transmit first signals with a first polarization electric field strength direction and second signals with a second polarization electric field strength direction according to received signals. The third switching element receives the first signals and the second signals, or switches signals received from the RF transceiver module and feeds to the first switching element or the second switching element. A protective layer comprises a liquid-crystal polymer material and arranged on above mentioned modules.

In an embodiment, the first switching element, the second switching element, and the third switching element are semiconductor micro-electro-mechanical system modules.

In an embodiment, the millimeter wave RF structure further comprises a liquid-crystal polymer dielectric layer. The liquid-crystal polymer dielectric layer is located between the substrate and the protective layer. The dual-polarized antenna element is arranged between the protective layer and the liquid-crystal polymer layer. The first switching element, the second switching element, and the third switching element are arranged between the liquid-crystal polymer dielectric layer and the substrate.

In an embodiment, each antenna of the dual-polarized antenna element is in a shape of a circle or a square with four sides of approximately the same length.

In an embodiment, there is an angle between the dual-polarized antenna element and the switching module.

In an embodiment, the dual-polarized antenna element is a double-radiation layer structure comprising a liquid-crystal polymer material.

In an embodiment, a side length of the antenna is between 1.9 mm and 3.5 mm when the carrier frequency of the dual-polarized antenna is between 26.5 GHz to 29.5 GHz or 37 GHz to 41 GHz.

In an embodiment, the RF transceiver module includes an RF transceiver element and RF integrated circuit chip. The RF transceiver element is configured to implement RF transmission and receiving, and the RF integrated circuit chip is a gallium arsenide processed.

In an embodiment, the substrate is a multi-layer flexible circuit board comprising a liquid-crystal polymer dielectric layer.

In an embodiment, the RF transceiver module is arranged on a second substrate separated from the substrate. The substrate and the second substrate are of the same liquid-crystal polymer substrate.

In an embodiment, the substrate and the second substrate are of different materials. The second substrate is an epoxy resin substrate, a polyphenylene oxide resin substrate, or a fluorine resin substrate.

In an embodiment, the first switching element and the second switching element are respectively electrically connected to the dual-polarized antenna elements by Butler matrix.

The embodiments of this application may have the following beneficial effects: An LCP substrate is used to alleviate a problem of an excessive high-frequency signal loss. A filter pattern is designed in an active circuit to cause the filter to become a matching circuit of an antenna and a switching module. A micro-electro-mechanical system switch (MEMS switch) is further used to effectively reduce the size of a circuit and switch between different electric field polarization directions, thereby enhancing characteristics of the LCP substrate for millimeter waves, and implementing high-frequency, high-speed transmission while ensuring the high reliability.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF MAJOR ELEMENTS

Figure 1:
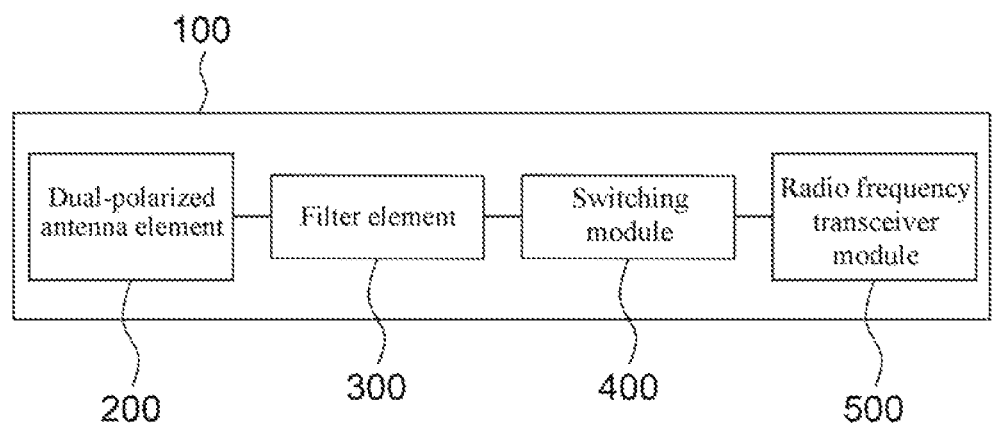
FIG. 1 is a block diagram of a millimeter wave RF structure according to an embodiment of the present invention.

Substrate 100, Second substrate 110, Dual-polarized antenna element 200, Switching module 400, Radio frequency transceiver module 500, First switching element 410, Butler matrix 411 and 421, Switch element 412 and 422, Second switching element 420, Third switching element 430, Protective layer 600, Liquid-crystal polymer dielectric layer 700.

DETAILED DESCRIPTION

To make the objectives, technical solutions, and advantages of the embodiments of this application more comprehensible, the following clearly and completely describes the technical solutions in the embodiments of the present invention with reference to accompanying drawings in the embodiments of the present invention.

Figure 2:
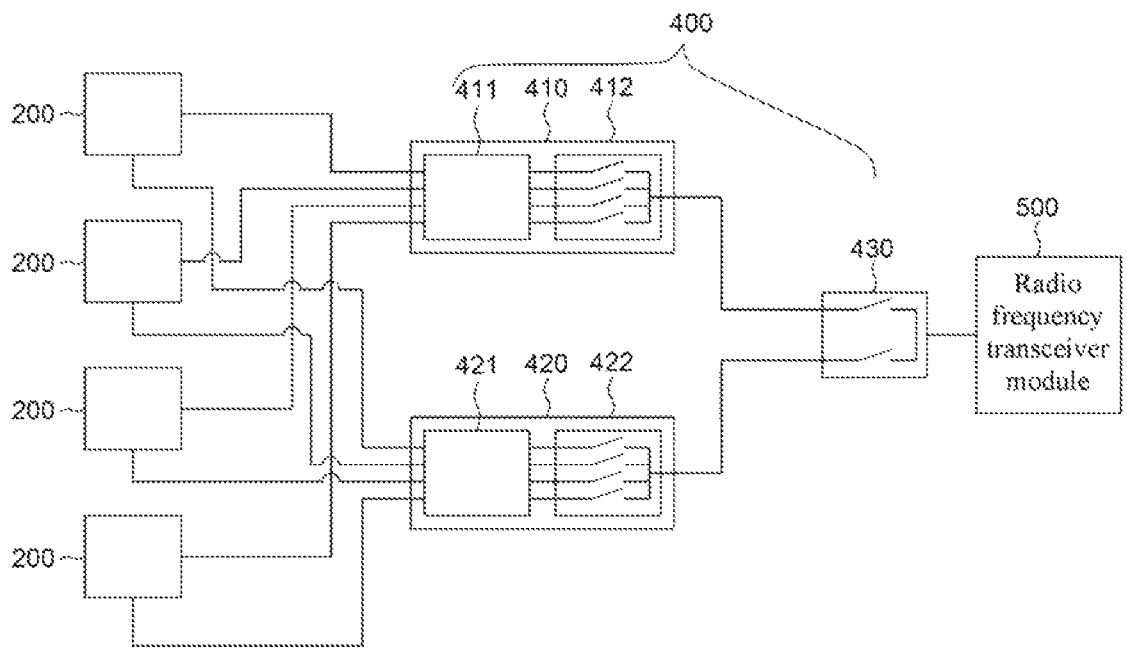
FIG. 2 is a block diagram of a switching module according to an embodiment of the present invention.
Figure 3:
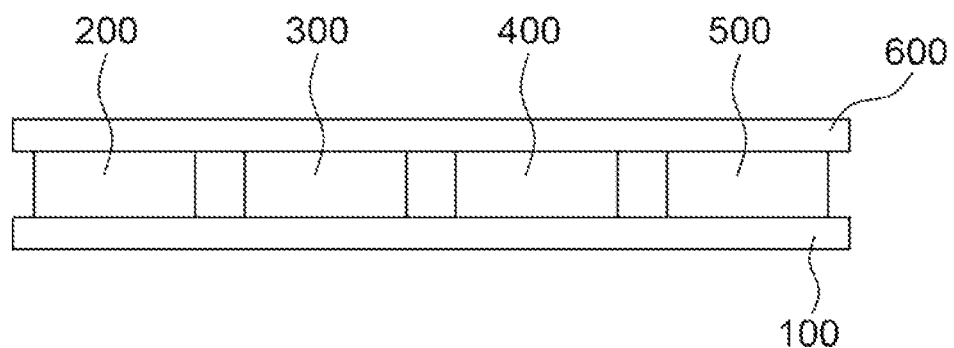
FIG. 3 is a schematic sectional view of the millimeter wave RF structure according to the embodiment of FIG. 1.

Referring to FIG. 1 to FIG. 3, an embodiment of the millimeter wave RF structure according to the present invention. The millimeter wave RF structure includes a substrate 100, at least one dual-polarized antenna element 200, a RF transceiver module 500 and a switching module 400. The material of the substrate 100 includes liquid-crystal polymer. In some embodiments, the substrate 100 may be a multi-layer flexible circuit board. The multi-layer flexible circuit board includes at least a liquid-crystal polymer dielectric layer.

The dual-polarized antenna element 200 is arranged on the substrate 100, and is configured to transmit and receive frequency signals. The RF transceiver module 500 is configured to transmit and receive frequency signals with an electric field strength direction unpolarized.

In an embodiment, the dual-polarized antenna element 200 may be a double-radiation layer structure including a liquid-crystal polymer material. The second radiation layer of the dual-polarized antenna element 200 is above a first radiation layer, but not in contact with the first radiation layer. The RF transceiver module 500 is electrically coupled to the dual-polarized antenna element 200, and the RF transceiver module 500 transmits or receives a wireless signal through the dual-polarized antenna element 200. The dual-polarized antenna element 200 is an omnidirectional antenna or a highly directional antenna. The shape of each antenna is symmetrical with an axis of two poles. In this embodiment, the two poles are orthogonal, so the antenna is in a shape of a circle or a square with four sides of approximately the same length, to produce a better dual polarization effect. In an embodiment, a carrier frequency of the dual-polarized antenna may be from 30 GHz to 300 GHz. In this embodiment, when an operating frequency is from 26.5 GHz to 29.5 GHz or 37 GHz to 41 GHz, a side length of a corresponding patch antenna is from 1.9 mm to 3.5 mm.

The switching module 400 is electrically connected to the dual-polarized antenna element 200 and the RF transceiver module 500. The switching module 400 includes a first switching element 410 and a second switching element 420 electrically connected to the dual-polarized antenna element 200, and a third switching element 430 electrically connected to the first switching element 410 and the second switching element 420. The dual-polarized antenna elements 200 receive or transmit signals in at least two different electric field strength directions according to arrangement of the switching elements (410, 420, 430). For example, when the first switching element 410 is arranged in a first polarization direction (for example, a horizontal direction), a signal transmitted and received by the first switching element 410 through the dual-polarized antenna element 200 is a first signal (for example, a horizontal signal) with the first polarization direction as an electric field strength direction. When the second switching element 420 is arranged in a second polarization direction (for example, a vertical direction), a signal transmitted and received by the second switching element 420 through the dual-polarized antenna element 200 is a second signal (for example, a vertical signal) with the second polarization direction as an electric field strength direction. The third switching element 430 receives the first signal from the first switching element 410 and the second signal from the second switching element 420, or switches a signal received from the RF transceiver module 500 and feeds the signal to the first switching element 410 or the second switching element 420.

The RF transceiver module 500 alternately transmits a receive signal (Rx) and a transport signal (Tx) to the third switching element 430 according to a set time interval. The time interval may be as short as several milliseconds, so as to transmit and receive signals in a short time period. The third switching element 430 alternately transmits signals to the first switching element 410 and the second switching element 420 according to a set time interval. The first switching element 410 and the second switching element 420 respectively transmit a first signal (for example, a horizontal signal) with a first polarization direction as an electric field strength direction and a second signal (for example, a vertical signal) with a second polarization direction as an electric field strength direction. The time interval may be as short as several milliseconds, so as to transmit and receive signals in a short time period. It should be noted that when a signal is received, its polarization direction of the signal is determined by its transporting antenna. The first switching element 410 not only receives signals with the first polarization direction, but also receives component signals with the first polarization direction. That is, a signal component with the first polarization direction included in a signal deviating from the first polarization direction is also the first signal. The second switching element 420 not only receives signals with the second polarization direction, but also receives component signals with the second polarization direction. That is, a signal component with the second polarization direction included in a signal deviating from the second polarization direction is also the second signal. Therefore, the two polarization directions of the dual-polarized antenna in this embodiment are designed to be orthogonal to effectively improve the efficiency of receiving signals. In this embodiment, the millimeter wave RF structure further includes a protective layer 600. The material of the protective layer 600 includes liquid-crystal polymer. The protective layer 600 is arranged on the above mentioned modules.

In an embodiment, the first switching element 410, the second switching element 420, and the third switching element 430 of the switching module 400 are semiconductor micro-electro-mechanical systems (MEMS) to effectively reduce the size of the circuits.

Figure 4:
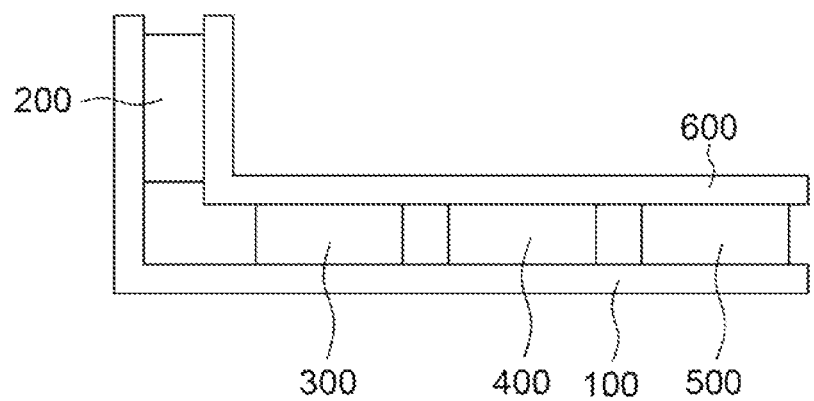
FIG. 4 is a schematic sectional view of another embodiment pattern of the millimeter wave RF structure.
Figure 5:
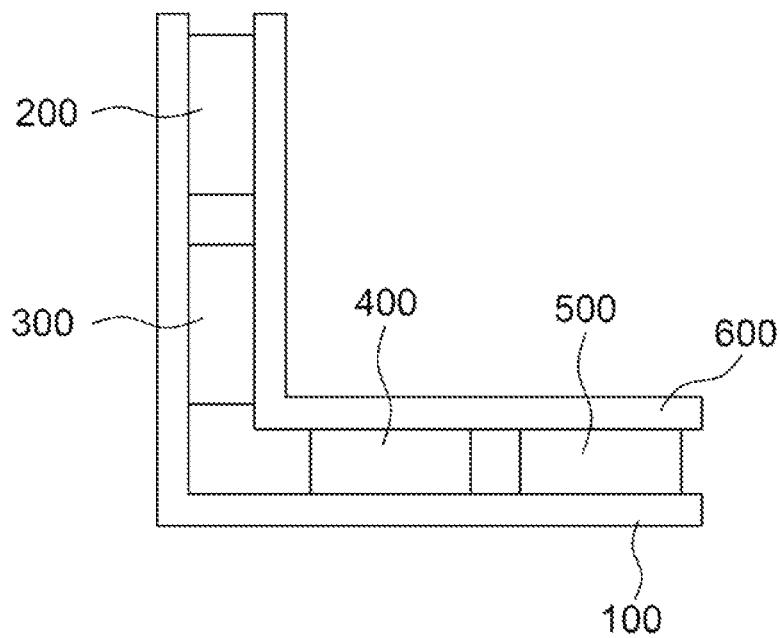
FIG. 5 is a schematic sectional view of still another embodiment pattern of the millimeter wave RF structure.

In an embodiment, the RF structure may be bent to fit the product shape or space configuration. An angle (as shown in FIG. 4 and FIG. 5) is formed between the section having the dual-polarized antenna element 200 and the section having the switching module 400 after bending. The bending angle is theoretically not limited.

In this embodiment, using four dual-polarized antenna elements 200 (as shown in FIG. 2) as an example, the four dual-polarized antenna elements 200 are electrically connected to two Butler matrix 411 and 421 (4×4 Butler matrix), and the first switching element 410 and the second switching element 420 are electrically connected to the four dual-polarized antenna elements 200 by the respective Butler matrix 411 and 421.

A Butler matrix is a feed network for beamforming of antennas, and is used to control the directions of one or more beams of RF signal transmission. The Butler matrix is an N×N matrix including bridge couplers and fixed phase shifters. N is a power of 2. The device includes N input ports connected to a feed unit and N output ports connected to an antenna. In this embodiment, there are 4 input ports connected to the feed unit and 4 output ports connected to the antenna. The Butler matrix can feed signals with various phase differences, so that RF signal beams are in desired directions. By switching RF signals to a desired beam port to shift beam directions, 4 types of field shapes are produced, so as to expand a beam field shape and expand the angle that the millimeter wave RF structure may transmit and receive signals.

Further, at least one filter element 300 is arranged between the dual-polarized antenna element 200 and the switching module 400 to filter signals. In this embodiment, the filter element 300 is arranged between the dual-polarized antenna element 200 and the first switching element 410 and the second switching element 420. The filter element 300 and the switching element 130 are configured to form a communication path, and are coupled to the dual-polarized antenna element 200 to form a matching circuit, to provide a filtering path between the dual-polarized antenna element 200 and the switching module 400, and is configured to optimize the frequency signal, to filter out undesired frequencies in an RF signal transmitted or received by the dual-polarized antenna element 200.

Figure 6:
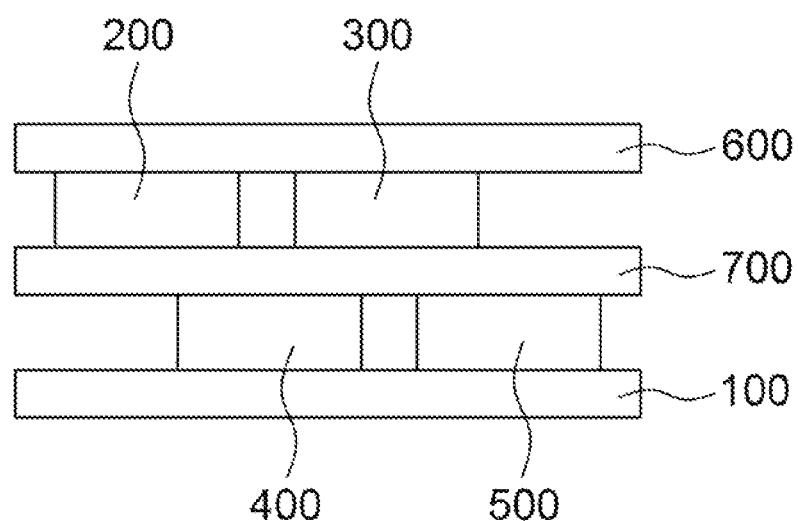
FIG. 6 is a schematic sectional view of a millimeter wave RF structure according to another embodiment of the present invention.

Referring to FIG. 6, in this embodiment, the millimeter wave RF structure further includes a liquid-crystal polymer dielectric layer 700. The liquid-crystal polymer dielectric layer 700 is arranged between the substrate 100 and the protective layer 600. The dual-polarized antenna element 200 is arranged between the protective layer 600 and the liquid-crystal polymer dielectric layer 700. The first switching element 410, the second switching element 420, and the third switching element 430 included in the switching module 400 are arranged between the liquid-crystal polymer dielectric layer 700 and the substrate 100. In practice, the RF transceiver module 500 may be arranged between the liquid-crystal polymer dielectric layer 700 and the substrate 100, and the filter element 300 is arranged between the protective layer 600 and the liquid-crystal polymer dielectric layer 700. Through a stacked configuration, the overall size of the circuits can be further reduced. In other embodiments, the dual-polarized antenna element 200 may not be covered by the protective layer 600, and an electroplating process is utilized instead to achieve the protection function. Antenna radiation performance is not affected due to the dielectric coefficient of the protective layer 600, thereby factors influencing antenna tuning is reduced.

Figure 7:
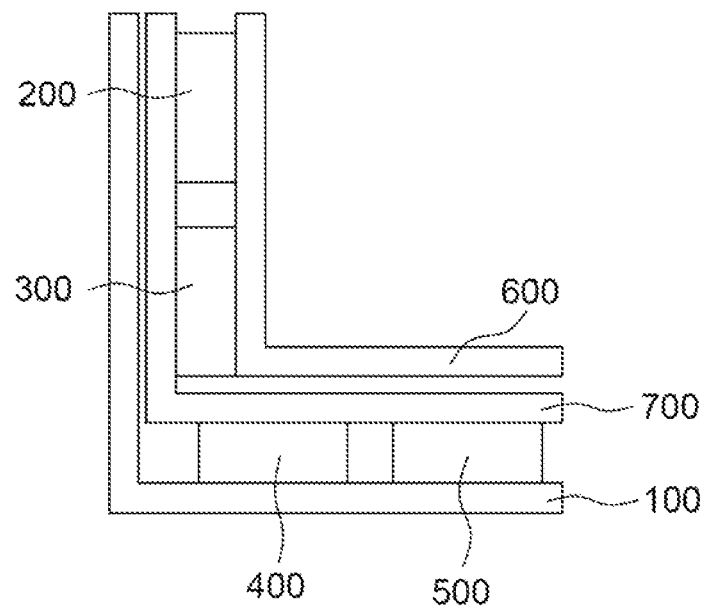
FIG. 7 is a schematic sectional view of another embodiment pattern of FIG. 6.

Similarly in another embodiment, the RF structure shown in FIG. 6 may be bent to fit into the product shape or space configuration. An angle (as shown in FIG. 7) is formed between the section having the dual-polarized antenna element 200 and the section having the switching module 400 after bending. The bending angle is theoretically not limited.

In an embodiment, the RF transceiver module 500 is an RF integrated circuit chip with an RF transceiver elements such as transmitting module (Tx), receiving module (Rx), RF power amplifier (PA), and low noise amplifier (LNA). The RF transceiver element is configured to perform RF transmission and RF receiving, and an RF integrated circuit chip may include PA, LNA and more functions. The RF integrated circuit process chip in the RF transceiver module 500 is a gallium arsenide processed chip, coupled to the dual-polarized antenna element 200, and included a plurality of gallium arsenide RF circuits.

In another embodiment, the integrated circuit chip of the RF transceiver module 500 may also be a process chip of other III-V group elements, such as SiC, GaN, GaAs, InP, Si, etc., and all of the elements can effectively increase power density and are applicable to the millimeter wave RF structure.

Figure 8:
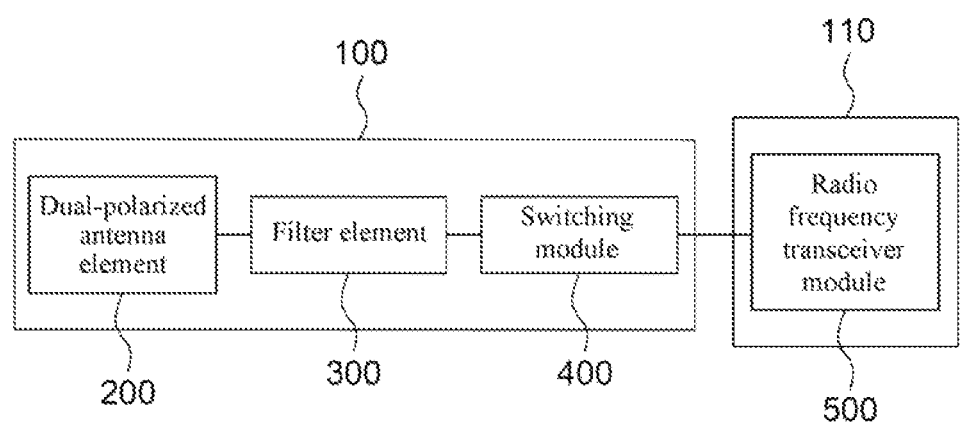
FIG. 8 is a block diagram of a millimeter wave RF structure according to another embodiment of the present invention.
Figure 9:
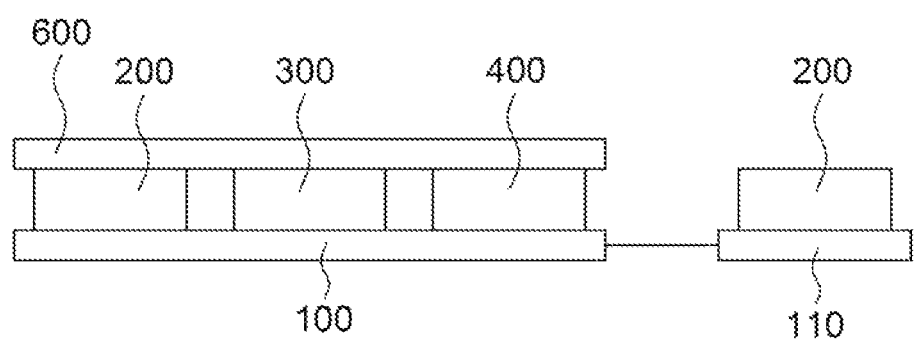
FIG. 9 is a schematic sectional view of the millimeter wave RF structure according to the embodiment of FIG. 8.

Referring to FIG. 8 and FIG. 9, in an embodiment, the RF transceiver module 500 may be arranged on a second substrate 110 separated from the substrate 100, and the substrate 100 and the second substrate 110 may be the same liquid-crystal polymer substrate.

In another embodiment, the substrate 100 and the second substrate 110 may be of different materials. The second substrate 110 may be an epoxy resin substrate, a polyphenylene oxide resin substrate, or a fluorine resin substrate.

In summary, the millimeter wave RF structure of the present invention includes dual-polarized antenna, filter element, switching module, and an RF transceiver module. The dual-polarized antenna is designed on a liquid-crystal polymer (LCP) substrate to aid in required frequency bands. The filter element is placed at the back of the antenna and the main advantage of such arrangement is that the filter element can filter noise of the antenna but does not occupy space on the front surface. The design of the filter may include passive elements such as inductors and capacitors. The filter may share the framework design of circuits along with the antenna, and also to optimize matching between the antenna element and the switching element. The switching module utilizes RF MEMS that have advantages of small volume, low loss, low power consumption, good isolation, and good linearity as compared to conventional switching elements. A microwave gallium arsenide (GaAs) processed integrated circuit is preferred for an RF chip. Because a GaAs compound semiconductor has a higher electron mobility rate than a conventional silicon wafer and has characteristics of good resistance to interference, low noise, high voltage resistance, and compatibility in a high frequency. The GaAs compound semiconductor is applicable to high-frequency transmission. The Butler matrix shifts beamforming directions and expands the radiation angle that the millimeter wave RF structure may transmit and receive signals.

Although the present invention is disclosed above with the foregoing embodiments, the embodiments are not intended to limit the present invention. Equivalent replacements such as changes and improvements, made by anyone familiar with related arts, without departing from the spirit and scope of the present invention still fall within the protection scope of the present invention.

What is claimed is:

1. A millimeter wave radio frequency (RF) structure, comprising:
    a substrate, wherein the substrate material comprises a liquid-crystal polymer material;
    at least one dual-polarized antenna element, arranged on the substrate, and configured to transmit and receive a frequency signal;
    an RF transceiver module, configured to transmit and receive a frequency signal with an electric field strength direction unpolarized;
    a switching module, electrically connected to the at least one dual-polarized antenna element and the RF transceiver module, wherein the switching module comprises a first switching element and a second switching element electrically connected to the at least one dual-polarized antenna element, and a third switching element electrically connected to the first switching element and the second switching element; the first switching element and the second switching element respectively transmit a first signal with a first polarization as an electric field strength direction and a second signal with a second polarization as an electric field strength direction according to a received signal; and the third switching element receives the first signal from the first switching element and the second signal from the second switching element, or switches a signal received from the RF transceiver module and feeds the signal to the first switching element or the second switching element; and
    a protective layer, wherein a material of the protective layer comprises a liquid-crystal polymer material, and the protective layer is arranged on the modules.

2. The millimeter wave RF structure of claim 1, wherein the first switching element, the second switching element, and the third switching element are semiconductor microelectro-mechanical system (MEMS).

3. The millimeter wave RF structure of claim 1, wherein the millimeter wave RF structure further comprises a liquid-crystal polymer dielectric layer, and the liquid-crystal polymer dielectric layer is located between the substrate and the protective layer; the at least one dual-polarized antenna element is arranged between the protective layer and the liquid-crystal polymer dielectric layer; and the first switching element, the second switching element the third switching element are respectively arranged between the liquid-crystal polymer dielectric layer and the substrate.

4. The millimeter wave RF structure of claim 1, wherein each antenna of the dual-polarized antenna element is in a shape of a circle or a square with four sides of approximately the same length.

5. The millimeter wave RF structure of claim 1, wherein there is an angle between the at least one dual-polarized antenna element and the switching module.

6. The millimeter wave RF structure of claim 1, wherein the dual-polarized antenna element is a double-radiation layer structure comprising a liquid-crystal polymer material.

7. The millimeter wave RF structure of claim 1, wherein when a carrier frequency of the dual-polarized antenna is from 26.5 GHz to 29.5 GHz or 37 GHz to 41 GHz, a side length of the antenna is from 1.9 mm to 3.5 mm.

8. The millimeter wave RF structure of claim 1, wherein the RF transceiver module is an RF integrated circuit comprises an RF transceiver element configured for RF transmission and RF receiving, and an RF integrated circuit chip for RF power amplifier and low noise amplifier.

9. The millimeter wave RF structure of claim 1, wherein the substrate is a multi-layer flexible circuit board, wherein the multi-layer flexible circuit board comprising a liquid-crystal polymer layer.

10. The millimeter wave RF structure of claim 1, wherein the RF transceiver module is arranged on a second substrate separated from the substrate, and the substrate and the second substrate are of same liquid-crystal polymer substrate.

11. The millimeter wave RF structure of claim 10, wherein the substrate and the second substrate are of different materials, and the second substrate is an epoxy resin substrate, a polyphenylene oxide resin substrate, or a fluorine resin substrate.

12. The millimeter wave RF structure of claim 1, wherein the first switching element and the second switching element are respectively electrically connected to the dual-polarized antenna elements by a Butler matrix.

* * * * *